United States Patent
Agostinelli (10) Patent No.: US 10,848,774 B2
(45) Date of Patent: Nov. 24, 2020

(54) METHOD FOR CODING AND DECODING HDR IMAGES

(71) Applicant: TRELLIS EUROPE S.R.L., Galazzano (SM)

(72) Inventor: Massimiliano Agostinelli, Rome (IT)

(73) Assignee: TRELLIS EUROPE S.R.L., Galazzano (SM)

(*) Notice: Subject to any disclaimer, the term of this patent is extended or adjusted under 35 U.S.C. 154(b) by 87 days.

(21) Appl. No.: 16/303,575

(22) PCT Filed: May 19, 2017

(86) PCT No.: PCT/IB2017/052956
§ 371 (c)(1),
(2) Date: Nov. 20, 2018

(87) PCT Pub. No.: WO2017/199210
PCT Pub. Date: Nov. 23, 2017

(65) Prior Publication Data
US 2019/0208218 A1    Jul. 4, 2019

(30) Foreign Application Priority Data

May 20, 2016    (IT) .............................. UA2016A3652

(51) Int. Cl.
| | |
|---|---|
| *H04N 19/00* | (2014.01) |
| *H04N 19/33* | (2014.01) |
| *H04N 19/103* | (2014.01) |
| *H04N 19/463* | (2014.01) |
| *H04N 19/186* | (2014.01) |

(Continued)

(52) U.S. Cl.
CPC ........... *H04N 19/33* (2014.11); *H04N 19/103* (2014.11); *H04N 19/182* (2014.11); *H04N 19/184* (2014.11); *H04N 19/186* (2014.11); *H04N 19/42* (2014.11); *H04N 19/423* (2014.11); *H04N 19/463* (2014.11)

(58) Field of Classification Search
CPC .................................. H04N 19/00; G06T 5/00
See application file for complete search history.

(56) References Cited

U.S. PATENT DOCUMENTS

| | | |
|---|---|---|
| 8,237,865 B2 | 8/2012 | Salvucci |
| 8,462,194 B2 | 6/2013 | Salvucci |

(Continued)

FOREIGN PATENT DOCUMENTS

| | | |
|---|---|---|
| EP | 2445214 | 4/2012 |
| WO | 2013039730 | 3/2013 |

(Continued)

OTHER PUBLICATIONS

"Non-Final Office Action", U.S. Appl. No. 15/779,370, dated Aug. 1, 2019, 15 pages.

(Continued)

*Primary Examiner* — Maryam A Nasri
(74) *Attorney, Agent, or Firm* — Colby Nipper PLLC (57) ABSTRACT

The invention relates to a method for encoding HDR images, of the type wherein the HDR image is encoded in a first data stream containing a LDR image with colour range lower than that of the HDR image, and in a second data stream containing a residual image obtained from the HDR image and from the LDR image.

20 Claims, 5 Drawing Sheets

(51) Int. Cl.
  *H04N 19/182* (2014.01)
  *H04N 19/184* (2014.01)
  *H04N 19/42* (2014.01)
  *H04N 19/423* (2014.01)

(56) References Cited

U.S. PATENT DOCUMENTS

| | | | |
|---|---|---|---|
| 9,058,639 B2 | 6/2015 | Salvucci | |
| 9,578,335 B2 | 2/2017 | Salvucci | |
| 9,736,483 B2 | 8/2017 | Salvucci | |
| 10,587,901 B2 | 3/2020 | Agostinelli | |
| 2010/0329554 A1 | 12/2010 | Zhai et al. | |
| 2012/0170842 A1* | 7/2012 | Liu | G06T 5/50 382/167 |
| 2015/0023433 A1 | 1/2015 | Ninan et al. | |
| 2017/0094281 A1* | 3/2017 | Chalmers | H04N 19/46 |
| 2017/0310981 A1 | 10/2017 | Agostinelli | |
| 2018/0278968 A1 | 9/2018 | Agostinelli | |

FOREIGN PATENT DOCUMENTS

| | | |
|---|---|---|
| WO | 2016055875 | 4/2016 |
| WO | 2017090068 | 6/2017 |

OTHER PUBLICATIONS

"Restriction Requirement", U.S. Appl. No. 15/779,370, 7 Pages.
"Notice of Allowance", U.S. Appl. No. 15/779,370, dated Nov. 22, 2019, 13 Pages.
Chen, et al., "JPEG Compatible Coding of High Dynamic Range Imagery using Tone Mapping Operators", School of Computer Science, The University of Nottingham, UK, and, Thomson Broadband R&D (Beijing) Co., Ltd, China, Jan. 2006, 7 pages.
Mantiuk, et al., "Backward Compatible High Dynamic Range MPEG Video Compression", MPI Informatik, 2006, 11 pages.
"International Search Report", PCT Application No. PCT/IB2017/052956, dated Sep. 18, 2017, 4 pages.
"International Search Report and Written Opinion", PCT Application No. PCT/IT2016/000279, dated Mar. 22, 2017, 11 pages.
"Preliminary Report on Patentability", PCT Application No. PCT/IT2016/000279, dated Feb. 12, 2018, 22 pages.
Drago, et al., "Adaptive Logarithmic Mapping for Displaying High Contrast Scenes", Computer Graphics Forum, Eurograhics 2003; P. Brunet and D. Fellner; vol. 22, No. 3, Sep. 1, 2003, 10 pages.
Francois, et al., "High Dynamic Range and Wide Color Gamut Video Coding in HEVC: Status and Potential Future Enhancements", IEEE Transactions on Circuits and Systems for Video Technology, vol. 26, No. 1, Jan. 2016, 2016, 14 pages.
Garbas, et al., "Inter-Layer Prediction for Backwards Compatible High Dynamic Range Video Coding with SVC", 2012 Picture Coding Symposium, May 7-9, 2012, Krakow, Poland, May 2012, 4 pages.
Mai, et al., "Optimizing a Tone Curve for Backward-Compatible High Dynamic Range Image and Video Compression", IEEE Transactions on Image Processing, vol. 20, No. 6, Jun. 2011, Jun. 2011, 14 pages.
Salih, et al., "Tone Mapping of HDR Images: A Review", IEEE; Intelligent and Advanced Systems (ICIAS); 2012 4th International Conference on Intelligent and Advaned Systems, 2011, pp. 368-373.
Spaulding, et al., "Extending the Color Gamut and Dynamic Range of an sRGB Image Using a Residual Image", Electronic Imaging Products, R&D, Eastman Kodak Company, Jul. 2, 2002, 16 pages.
Pursuant to MPEP § 2001.6(b) the applicant brings the following co-pending application to the Examiner's attention: U.S. Appl. No. 15/779,370.

* cited by examiner

| LDR 8 bit | LDR 16 bit |
|---|---|
| 00000000 | 0000000000000000 |
| 00000001 | 0000000000000100 |
| 00000010 | 0000000000001100 |
| 00000011 | 0000000000001111 |
| ... | |
| 11111111 | 1111000000000100 |

Fig. 3

| LDR 16 bit |
|---|
| 0000000000000000 |
| 0000000000000100 |
| 0000000000001100 |
| 0000000000001111 |
| |
| 1111000000000100 |

METHOD FOR CODING AND DECODING HDR IMAGES

TECHNICAL FIELD

The present invention relates to methods for encoding and decoding images and videos.

Particularly the invention relates to methods, computer programs and apparatuses able to encode and decode HDR images.

PRIOR ART

From early digital photography up to current times technology has considerably moved forward.

Nowadays even widely diffused devices, such as iPhone 6, allow HDR (English acronym for High Dynamic Range) photographs to be taken, which have a color range much higher than conventional 8-bit images (called also as LDR or low dynamic range images).

While LDR images represent each color (Red, Green or Blue) with 8 bits and therefore allowing 256 different color shades to be provided, in the case of HDR images the colors are generally represented in floating point, usually using 16 or more bits, such to have a higher resolution. The floating point representation allows a number of shades to be provided which is extraordinarily higher than 256 shades provided for 8-bit images.

In order to allow HDR images to be compressed by using conventional JPEG or MPEG codecs, literature discloses several methods that provide to add steps for pre-processing the HDR image in order to obtain a satisfactory compression in encoding phase and contemporaneously allowing it to be faithfully reconstructed during decoding.

The U.S. Pat. No. 8,462,194 describes different methods for processing HDR images, providing to generate a low dynamic range (LDR) image by clamping the HDR image. One of the methods described in U.S. Pat. No. 8,462,194 provides also to generate an image (called as FC-frame) obtained by dividing each RGB component of the LDR image by a respective RGB component of the original HDR image. Both the LDR image and the FC-frame are separately encoded by MPEG codec. Thus a data file transporting the LDR image and the FC-Frame can be decoded both by a traditional decoder (that will decode only the LDR image) and by a new decoder that, by using the FC-frame and LDR image, will be able to reconstruct the HDR image.

Although being effective, the method known from U.S. Pat. No. 8,462,194 works well only if the LDR image is obtained by clamping the HDR image. If the LDR image is obtained in a different manner, the method may not properly work.

Moreover methods known from U.S. Pat. No. 8,462,194 are of the lossy type, that is they do not provide any tool for checking error due to the passage from 16 (or more) bits to 8 bits. Therefore the reconstructed HDR image may not be faithful to the original one.

OBJECTS AND SUMMARY OF THE INVENTION

The object of the present invention is to overcome prior art drawbacks.

Particularly the object of the present invention is to provide a method allowing HDR images to be effectively compressed and decompressed.

These and further objects of the present invention are achieved by means of encoding and decoding methods embodying the characteristics of the annexed claims, which are an integral part of the present description.

In one embodiment the invention is a method for encoding HDR images, of the type where the HDR image is encoded into a first data stream (called also as legacy codestream) containing a LDR image with a color range smaller than that of HDR image, and into a second data stream (called also as residual codestream) containing a residual image obtained from HDR image and LDR image. The method provides to process the LDR image and the HDR image so as to bring them in the same colour space with samples in logarithmic space;

generate a residual image in logarithmic space by subtracting the HDR image with samples in logarithmic space from the LDR image with samples in logarithmic space;

generate the residual image by processing the residual image in logarithmic space so as to adapt it to a format required as input by an encoder which inserts the residual image in the second data stream;

generate a first look-up table that maps the values of LDR image samples on the values of the processed LDR image in logarithmic space;

generate a second look-up table that maps the values of the residual image samples inserted in the second data stream on the values of the residual image in logarithmic space;

insert the first and the second look-up table in the first or in the second data stream. Such solution allows the HDR image to be encoded almost without losses (lossless or nearlossless). The use of look-up tables and the processing of data in logarithmic space allow losses to be reduced and the original HDR image to be optimally reconstructed. Look-up tables, as well as the residual image and the base LDR image, can be encoded by means of conventional codecs and transmitted with low band occupancy or stored with low memory occupancy.

In one embodiment the LDR image is obtained from HDR image by some processing operations, among which gamma correction or tone mapping plus gamma correction. In this embodiment the step generating the LDR image with samples in logarithmic space comprises the steps of:

a) converting the LDR image in a floating point format,
b) applying a gamma correction to the LDR image inverse to the gamma correction used to obtain the LDR image;
c) multiplying the gamma corrected LDR image by a matrix suitable to convert the gamma corrected LDR image in the colour space of the HDR image;
d) converting in logarithmic space the LDR image generated in step c).

Such solution provides the further advantage that the LDR image is processed such to be congruent with HDR image in the following comparison to generate the residual image.

In one embodiment, then, the values of the LDR image generated at step d) are scaled in the value range from 0 to 1, such to preserve color ratios among pixels, but preventing negative values from being maintained that could be generated in the conversion in logarithmic space.

In a further embodiment the method provides to decode the LDR image inserted in the first data stream and to process the image decoded in this manner such to generate the LDR image with samples in logarithmic space.

Advantageously, the HDR image with samples in logarithmic space is generated by converting the HDR image to be encoded in half log format.

In a preferred embodiment the residual image inserted in the residual codestream is obtained from the residual image in logarithmic space according to the following steps:
i. adding an offset value to all samples of the residual image in logarithmic space, the offset value being a positive value such that all the samples of the generated image after the sum have a value greater than or equal to zero;
ii. representing (1024) the samples of the image obtained at step i. with a number of bits required by the encoder which inserts the residual image in the second data stream;
iii. converting the image obtained at step ii. in a colour space accepted by the encoder which encodes the residual image in the second data stream.

The invention relates also to a method for decoding HDR images encoded by two data streams, one containing a base LDR image and one containing a residual image.

In one embodiment the invention is a method for processing image data, comprising the steps of:
receiving a first data stream containing a LDR image;
receiving a second data stream comprising a residual image necessary to reconstruct a HDR image;
decoding the LDR image from the first data stream;
decoding the residual image from the second data stream;
extracting from the first and/or second data stream a first and a second look-up table, wherein the first look-up table maps the values of the LDR image samples on the values of a LDR image (LDR*) in logarithmic space and wherein the second look-up table maps the values of the samples of the decoded residual image in YCbCr colour space on the values of a residual image in logarithmic space still with YCbCr colour space;
generating the LDR image in logarithmic space from the LDR image using the first look-up table to determine the values of the samples of the LDR image in logarithmic space;
generating the residual image in logarithmic space starting from the residual image by using the second look-up table to determine the values of the samples of the residual image in logarithmic space;
reconstructing a logarithmic HDR image by subtracting from the LDR image in logarithmic space the residual image in logarithmic space;
converting from logarithmic space to linear space and to the original format of the input HDR image, the logarithmic HDR image.

By means of look-up tables and by the processing of image data in logarithmic space, such solution allows a coded HDR image to be faithfully reconstructed by two data streams, one stream containing the base LDR image and one containing the residual image.

Advantageously the step reconstructing the HDR image in logarithmic space provides to add an offset value to the LDR image in logarithmic space. Such offset value is preferably equal to $2^{M+8-4}$ where M is equal to the number of extra bits of the residual image with respect to the LDR image.

The invention relates also to an encoder, a decoder and software able to implement above mentioned methods and better described in the description below.

Further advantageous characteristics are the subject matter of the annexed claims, which are an integral part of the present description.

BRIEF DESCRIPTION OF THE DRAWINGS

The invention will be described below with reference to some not limitative examples, provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION OF THE INVENTION

While the invention is susceptible to various modifications and alternative constructions, some preferred embodiments are shown in the drawings and will be described in details herein below.

It should be understood, however, that there is no intention to limit the invention to the specific disclosed embodiment but, on the contrary, the invention intends to cover all modifications, alternative constructions and equivalents that fall within the scope of the invention as defined in the claims.

The use of "for example", "etc.", "or" indicates non-exclusive alternatives without limitation, unless otherwise defined.

The use of "includes" means "includes, but not limited to", unless otherwise defined. The term codestream refers to a representation of data of a compressed image, which comprises all the data necessary to allow the samples of a digital image to be (completely or approximately) reconstructed.

Additional data defining the interpretation of sample data, such as colour space or space dimensions of the samples, may be necessary.

The term 'channel' of an image means one of its components, for example a RGB image comprises R (Red), G (Green) and B (Blue) channels.

The term 'pixel' means an elemental unit of the image composed of a number of scalar values equal to the number of channels; for example in a RGB image a pixel comprises three scalar values, one for red, one for green and one for blue.

The term 'sample' of an image means one of the values composing the pixels.

In the present detailed description below methods for encoding and decoding images will be disclosed which can be implemented by means of an encoder and a decoder suitably set to implement such methods.

Figure 1:
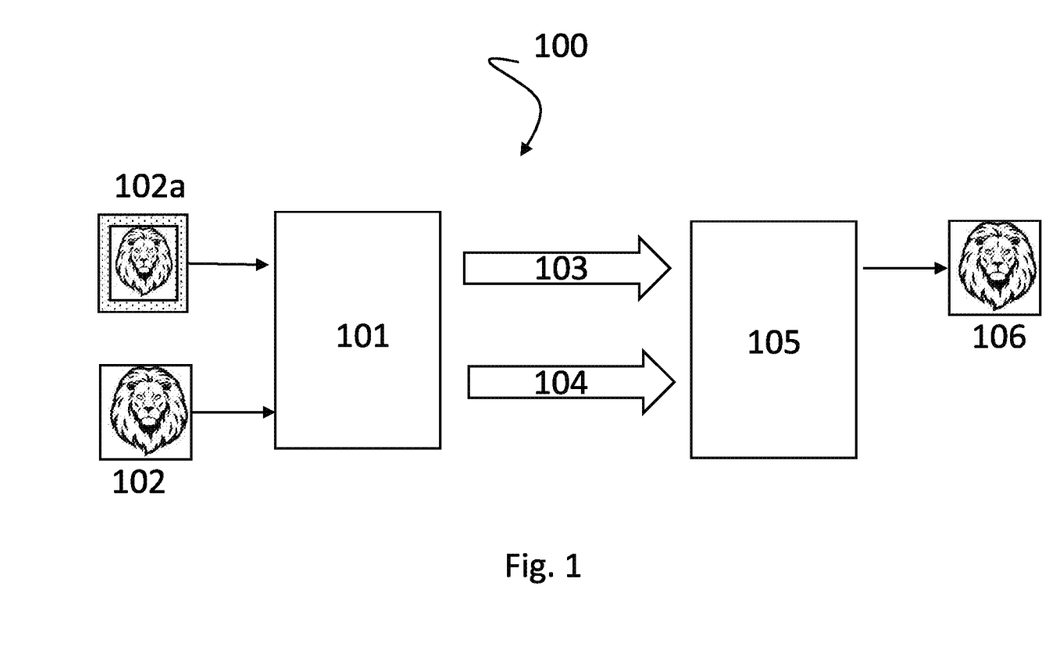
FIG. 1 is a system for encoding and decoding HDR images.

An image processing system according to the present invention is described herein with reference to the example of FIG. 1.

The image processing system 100 comprises an encoder 101 for encoding a high dynamic range (HDR) image 102. The encoder 101 receives as input the HDR image 102 and a low dynamic range (LDR) image 102a obtained by tone mapping or exposing and clamping the HDR image 102.

In one embodiment the encoder 101 is configured to receive as input only the HDR image 102 and to generate the image 102a from HDR image 102.

The encoder 101 processes HDR and LDR images (102, 102a) and generates as output a legacy codestream 103 comprising the encoded LDR image (preferably corresponding to the LDR image 102a) and a residual codestream 104 comprising a residual image that can be used, in combination with the encoded LDR image, to reconstruct the HDR image.

In order to process the HDR image in a legacy codestream and a residual codestream, the encoder 101 comprises electronic circuitry to implement an encoding method described below with reference to non-limitative examples of FIGS. 1 and 3.

The processing system 100 further comprises a decoder 105 configured to implement a decoding process as described in the description below, for example with reference to FIG. 2.

The decoder 105 receives as input the legacy codestream 103 and the residual codestream 104 and it generates as output a HDR image 106 corresponding to the original HDR image 102.

Figure 2:
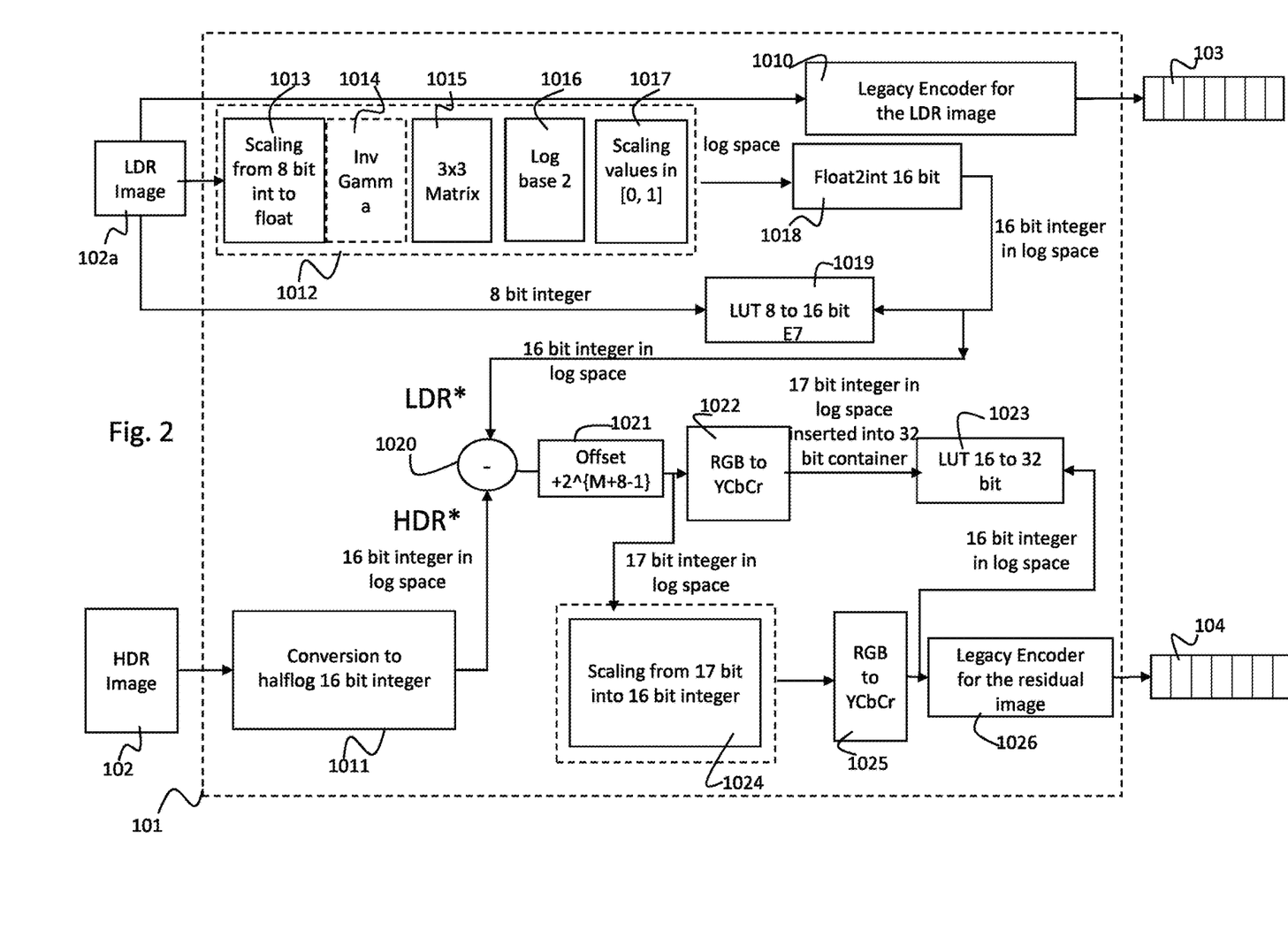
FIG. 2 is an encoder of the system of FIG. 1.

FIG. 2 shows a block diagram of the encoder 101 according to a first embodiment of the invention.

The encoder 101 of FIG. 2 implements a method for encoding the HDR image 102 that, in the example described below is a 32-bit image in floating point format (below as float).

As it can be better derived from the description below, the method provides to decompose information contained in HDR image into two layers: a low dynamic range (LDR) base image and a residual layer that are separately encoded.

The method therefore provides to generate a codestream (below called as legacy codestream) decodable by a legacy decoder, that is a device able to decode LDR images, for example a JPEG, MPEG, HEVC, H264 encoder etc.

Starting from the HDR image 102 that in this example is a 16-bit image, by tone mapping, a 8-bit LDR image 102a is generated. In an alternative embodiment, the LDR image 102a can be provided as input to the encoder together with the HDR image 102; in this case the encoder 101 does not need to generate the LDR image 102a.

The LDR image 102a therefore is passed to a legacy encoder 1010 that, in the non-limitative example of FIG. 2, is a lossless encoder.

Obviously the encoder 1010 requires a predetermined colour space for the input image that has to be encoded; the encoder 101 therefore can be provided with one or more conversion blocks intended to convert the LDR image from predetermined color spaces (e.g. RGB) to the colour space required by the encoder 1010. The legacy encoder 1010, in a manner known in itself, provides as output said legacy codestream 103, that is a sequence of data representing the encoded LDR image, below called also as Lossless Base Image.

For generating the residual layer the method provides to calculate a residual image as the logarithmic difference between HDR and LDR images.

For calculating the residual image, the HDR and LDR images are suitably processed. The HDR image 102 is converted in block 1011 in a half log 16 bit integer format that corresponds to the integer representation of a halffloat (half-precision floating-point format) in logarithmic space ($\log_2$).

As said above, also the LDR image 102a, is processed to generate the residual image. The LDR image 102a is provided as input to a processing block 1012, wherein the 8 bit integer image is firstly converted in a float format (block 1013), for example by dividing the values of the input samples by 255, according to the formula (1) below:

$$LDR\_float = LDR/255.0 \quad (1)$$

Where the formula (1) has to be intended as dividing each sample of the LDR image 102a as input to the block 1013 by the value 255.

If the LDR image 102a is not linear, then the method provides a linearization step carried out in dashed block 1014 (optional).

Linearization is obtained through a gamma correction that can be obtained, for example, by raising to power values of the input samples or by using a Look-Up Table or by using a well-known sRGB gamma function, or any gamma function.

The gamma correction possibly applied in block 1014 preferably is the inverse of that applied during the step generating the LDR image 102a. As an example, if the LDR image 102a is obtained by applying a tone mapping algorithm to the HDR image 102 and if such algorithm applies a gamma curve, e.g.

$$\Gamma = \frac{1}{x^{ldr\_gamma}}$$

(x being a R, G or B channel of the image and ldr_gamma being the gamma value, for example equal to 2.2), then in block 1014 the inverse gamma curve $\Gamma^{-1} = x^{ldr\_gamma}$ is applied to each channel of the image.

The LDR image, linearized after block 1014, is then brought in colour space of the HDR image 102 by the block 1015. The latter comprises a matrix (3×3 in the case herein disclosed of RGB images) that converts the smaller colour space of the LDR input image 102a into the wider colour space of the HDR image 102.

The output LDR image from block 1015 ($LDR_{WCG}$) therefore is obtained by the following formula:

$$LDR_{WCG} = H \cdot LDR_{in\_1015} \quad (2)$$

where $$H = \begin{bmatrix} a\_1 & a\_2 & a\_3 \\ a\_4 & a\_5 & a\_6 \\ a\_7 & a\_8 & a\_9 \end{bmatrix}$$

is the colour space conversion matrix and $LDR_{in\_1015}$ is the linearized image as input to block 1015.

Space conversion performed in block 1015 clearly is necessary only if the LDR image 102a and HDR image 102 are represented in two different colour spaces, for example the LRD image is represented in sRGB colour space and the HDR image 102 is represented in the XYZ colour space or in other colour spaces such as BT 2020 spaces etc.

If input images 102 and 102a are represented under the same colour space, then the matrix H is the identity matrix or the block 1015 is omitted.

The output image from block 1015 therefore is converted (block 1016) in logarithmic space by calculating the base 2 logarithm of the samples; the output $LDR_{log}$ image from the block 1016 is obtained therefore by the following formula:

$$LDR_{log} = \log_2(LDR_{WCG}) \quad (3)$$

Since the $LDR_{log}$ image may comprise negative values, the method provides to rescale the values of the samples of such image in the range [0,1]. This operation is performed, channel by channel, in block 1017 by the following formula:

$$LDR_{scaling|c} = \frac{(LDR_{log|c} - \min(LDR_{log|c}))}{(\max(LDR_{log|c}) - \min(LDR_{log|c}))} \quad (4)$$

Where $LDR_{scaling}$ is the output image from block 1017, the term |c is used to denote the considered channel (for example red, green and blue channels in RGB colour space), $\min(LDR_{log|c})$ and $\max(LDR_{log|c})$ are the minimum and maximum values of each considered channel respectively.

The output $LDR_{scaling}$ image from block 1012 is an image whose samples are expressed in logarithmic space by floating point representation.

In order to generate the LDR* image to be used to generate the residual image, the encoder 101 further comprises a block 1018 wherein the $LDR_{scaling}$ image is converted from floating point format to 16 bit integer format, the same of HDR* image. The conversion generated in block 1018 is the following:

$$LDR^* = LDR_{scaling} \cdot (2^{16} - 1) \quad (5)$$

LDR* image is then compared with LDR image 102a to generate look-up tables, one for each channel, to be used when decoding the image and correcting the compression errors.

In details, in block 1019 for each channel a Look-Up Table (LUT) is generated that maps the 8 bit values of the channel of the LDR image 102a on the 16 bit values of the LDR* image.

LUT is therefore filled in by taking a sample of LDR image 102a, looking which is its value (e.g. 00000001) and by watching which value such sample has taken in LDR* image (e.g. 0000000000000100) following processing performed in blocks 1012 and 1018.

Figure 3:
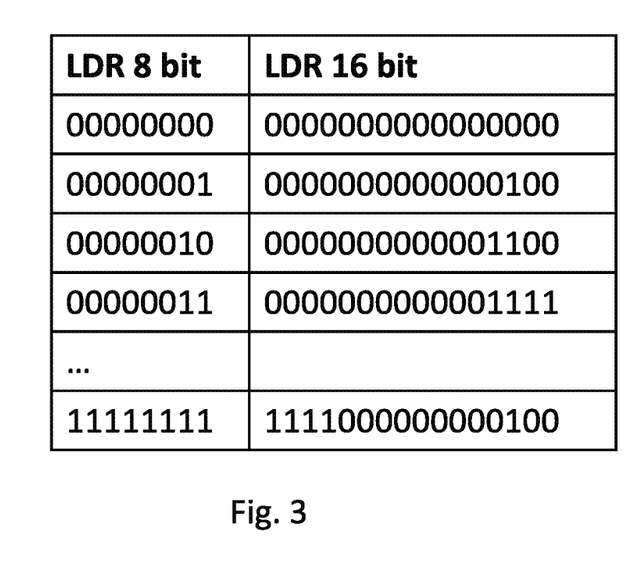
FIG. 3 is a look-up table for being used in the encoder of FIG. 2.
Figure 4:
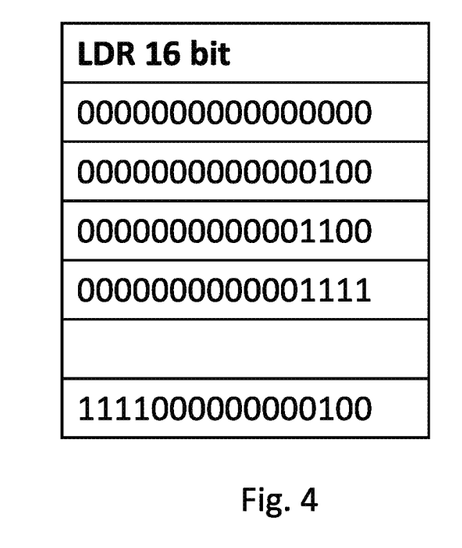
FIG. 4 is a look-up table alternative to that of FIG. 3.

A LUT example generated in block 1019 is shown in FIG. 3. As it can be seen LUT is a table of 256 ($2^8$) indexes that points out which 16 bit value is used to represent, in this encoding, a corresponding colour value expressed at 8 bits. Obviously the presence of the first column in LUT of FIG. 3 can be omitted and the encoder can store a LUT of the type shown in FIG. 4, being aware that the index of the column corresponds to the 8 bit value (expressed with integers). For example the first element of the LUT of FIG. 4 corresponds to the value 0 at 8 bits, the second to value 1 at 8 bits and so on. Preferably the LUT generated in block 1019 is inserted between metadata of LDR image transmitted with the legacy codestream 103.

The residual image in logarithmic space $RES_{log}$ is calculated (block 1020) as the difference between HDR* image (as output from block 1011) and the output LDR* image from block 1016:

$$RES_{log} = HDR^* - LDR^* \quad (6)$$

Before transmitting the residual image in the residual codestream, the encoding method provides some processing steps described below and shown in figures in blocks 1021-1026.

Firstly, in block 1021 an offset value is added to samples of the $RES_{log}$ image to bring all the samples to a positive value $$RES_{offset} = RES_{log} + 2^{M+8-1} \quad (7)$$

Where M is equal to the number of extra bits of the residual image $RES_{log}$ with respect to LDR image 102a.

Since the addition of the offset may generate a number higher than $2^{Nbit}$, the samples of the $RES_{offset}$ image are expressed by a 17 bit representation that is carried in a 32 bit container, wherein the first 15 bits are set to 0.

In block 1022 the $RES_{offset}$ image is converted in YCbCr colour space to allow it to be properly compared with the residual image that will be inserted in the residual codestream and such to generate a LUT to be used for lossless reconstruction of the residual image.

If the $RES_{offset}$ image is in the RGB colour space, then the colour space conversion performed in block 1022 is as follows:

$$RES_{YCbCr\_32} = T \cdot RES_{offset} \quad (8)$$

Where $$T = \begin{bmatrix} b\_1 & b\_2 & b\_3 \\ b\_6 & b\_5 & b\_6 \\ b\_7 & b\_8 & b\_9 \end{bmatrix}$$

is the matrix of colour space conversion from RGB to YCbCr and $RES_{YCbCr\_32}$ is the output image from block 1022.

The three RGB components of the $RES_{YCbCr\_32}$ image therefore can be expressed as it follows:

$$RES_{YCbCr\_32\_R} = b\_1 \cdot RES_{offset\_R} + b\_2 \cdot RES_{offset\_G} + b\_3 \cdot RES_{offset\_B}$$

$$RES_{YCbCr\_32\_G} = b\_4 \cdot RES_{offset\_R} + b\_5 \cdot RES_{offset\_G} + b\_6 \cdot RES_{offset\_B}$$

$$RES_{YCbCr\_32\_B} = b\_7 \cdot RES_{offset\_R} + b\_8 \cdot RES_{offset\_G} + b\_9 \cdot RES_{offset\_B}$$

Where b_1–b_9 are the coefficients of the conversion matrix T.

Before the real conversion performed in legacy encoder 1026, the $RES_{offset}$ image is converted in block 1024 from 17 bit logarithmic space (contained in 32 bits) to 16 bit space accepted by the legacy encoder 1026. The conversion performed in block 1024 therefore is the following one:

$$RES_{16} = \frac{RES_{offset}}{(2^{17} - 1)} \cdot (2^{16} - 1) \quad (9)$$

The 16-bit residual image is then converted in YCbCr space in block 1025. Such conversion is necessary since, in this embodiment, the legacy encoder requires as input an image in YCbCr colour space, obviously by using other encoders a conversion in a suitable colour space may be necessary.

The output image from block 1025 therefore is the following one:

$$RES_{YCbCr\_16} = T \cdot RES_{16} \quad (10)$$

$RES_{YCbCr\_16}$ image therefore is passed to the legacy encoder 1026 that generates the output residual codestream 104. In the preferred embodiment, the legacy encoder 1026 is of the lossless type, that is without losses, such as existing encoders of the JPEG, MPEG, PNG type. The discrete cosine transform (DCT) used in encoder 1026 is preferably selected depending on the bit depth of the input HDR image, for example 8 to 16 bits.

In order to allow the residual image to be reconstructed without losses, the encoder calculates, by block 1023, a further look-up table (LUT) that maps the values of the $RES_{YCbCr\_16}$ image on those of the $RES_{YCbCr\_32}$ image likewise in block 1019. LUT generated in block 1023 therefore will be a table with $2^{16}$ elements whose indexes are the values of the $RES_{YCbCr\_16}$ image, and whose contents are the 17 bit values of $RES_{YCbCr\_32}$ corresponding to 16 bit elements in $RES_{YCbCr\_16}$.

As for the LUT generated for the low dynamic range image LDR also the one generated for the residual image is preferably inserted among metadata of the Base image encoded in the legacy codestream.

Figure 5:
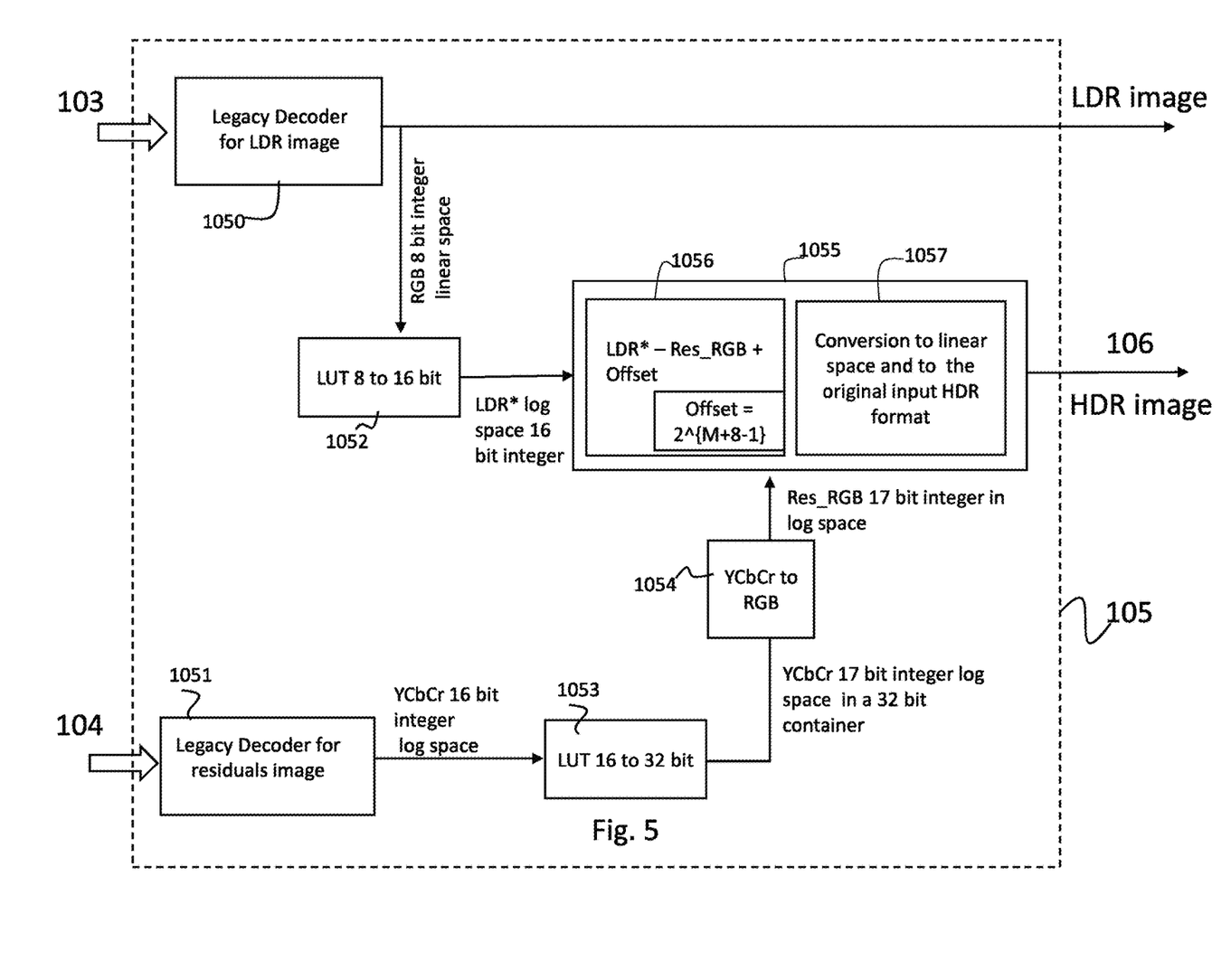
FIG. 5 is a decoder of the system of FIG. 1.

With reference to FIG. 5 here an example of a decoder 105 is described able to implement the decoding step and the reconstruction of the HDR image. The decoder 105 comprises a legacy decoder 1050 able to receive as input the legacy codestream 103 and, in a manner known in itself, able to decode the base LDR image. The legacy decoder 1050 is a decoder that carries out operations inverse to the legacy encoder 1010, therefore it generates as output a 8 bit integer image in the RGB colour space.

Similarly, the decoder 1051 receives as input the residual codestream 104 and in a manner known in itself, it decodes the residual image contained therein. The legacy decoder 1051 is a decoder that carries out operations inverse to the legacy encoder 1026 and it provides as output a 16 bit image in YCbCr space.

The method for decoding the HDR image provides to convert the decoded LDR image (that is output image from legacy decoder 1050) from 8-bit integer RGB format, to a 16-bit format with logarithmic space representation. This is obtained in block 1052 by using the look-up table generated in block 1019 and contained in metadata of the legacy codestream 103. Operatively, for each pixel of the reconstructed LDR image its value from 0 to 255 is used as the index of the look-up table to know which value from 0 to 65535 has to be given to the same pixel of the reconstructed 16 bit LDR image. The output image from block 1052 corresponds to the LDR* image used in the encoding phase.

Likewise, the reconstructed 8 bit residual image (that is output image from legacy decoder 1051) is converted in 17 bit format (inserted in a 32-bit container) with values in logarithmic space by using the look-up table generated in block 1023 and contained, in this embodiment, in metadata of the legacy codestream 103.

The 17 bit output image from the block 1053 therefore is converted in the RGB colour space in block 1054 and the HDR image is reconstructed in reconstruction block 1055.

Firstly in block 1056 the output image $RES_{RGB}$ from block 1054 is subtracted from the output LDR* image from block 1052 and the offset value introduced in block 1021 in encoding phase is added, therefore the formula applied in block 1056 is the following one:

$$HDR_{REC} = LDR^* - RES_{RGB} + \text{offset} \qquad (11)$$

Where $HDR_{REC}$ is the reconstructed image and offset is, in this case, equal to $2^{M+8-1}$, where M is equal to the number of extra bits for the residual image, used in encoding phase, extracted from the residual codestream. 8 bits in this embodiment.

The offset value can possibly be inserted among the metadata of the Base LDR image transmitted in the legacy codestream.

Thus a HDR image is obtained whose samples are expressed in logarithmic scale. In order to complete the reconstruction of the HDR image therefore the output image from block 1056 is converted from the logarithmic space to a linear space and it is brought back in the original format of the HDR image 102, that is a floating point or integer format. To complete such operations information contained in metadata of the Base LDR image is used.

In the light of the above, it is clear how the methods for encoding and decoding high dynamic range (HDR) images allow an efficacious compression and decompression to be carried out with low computational costs, thus achieving the above mentioned objects.

The present invention has different advantageous characteristics. It allows HDR images to be encoded while guaranteeing backward compatibility with legacy encoders without requiring high computational complexity. HDR images can be properly reconstructed regardless of the type of tone mapping used to obtain the LDR image from the HDR one. The use of look-up tables to map images used in the calculation of the residual image (LDR* and HDR*) with respect to images sent to encoders allows reference elements to be provided useful for a reconstruction almost without losses (near lossless). Operations performed for calculating the residual image, since mainly working in the logarithmic space, then allow losses to be further reduced which, on the contrary, are intrinsic to division operations that would be necessary when working in the linear space.

Although the invention has been described with reference to certain specific embodiments, the description shall not be construed in a limitative manner. Several modifications to the described embodiments, as well as alternative embodiments, can be implemented by the person skilled in the art having read the present description. It is clear for the person skilled in the art that the idea and the specific embodiment disclosed may be slightly modified or used as basis for modifying or designing other methods and structures. The division into logical blocks shall not be construed as limitative, as logical blocks may be differently grouped or organized with respect to what disclosed above.

Examples of alternative solutions can be the manner to obtain the linearized LDR image (LDR*) to be used for the calculation of the residual image. For example, in one embodiment shown in FIG. 6, the image as input to block 1013 is not the LDR image 102a as in FIG. 2 but it is obtained by decoding (block 1028) the image encoded in the legacy encoder 1010. In this embodiment, the LUT of block 1019 maps the values of the LDR* image, as output from block 1018, on values of the low dynamic range image as output from the decoding block 1028.

Figure 6:
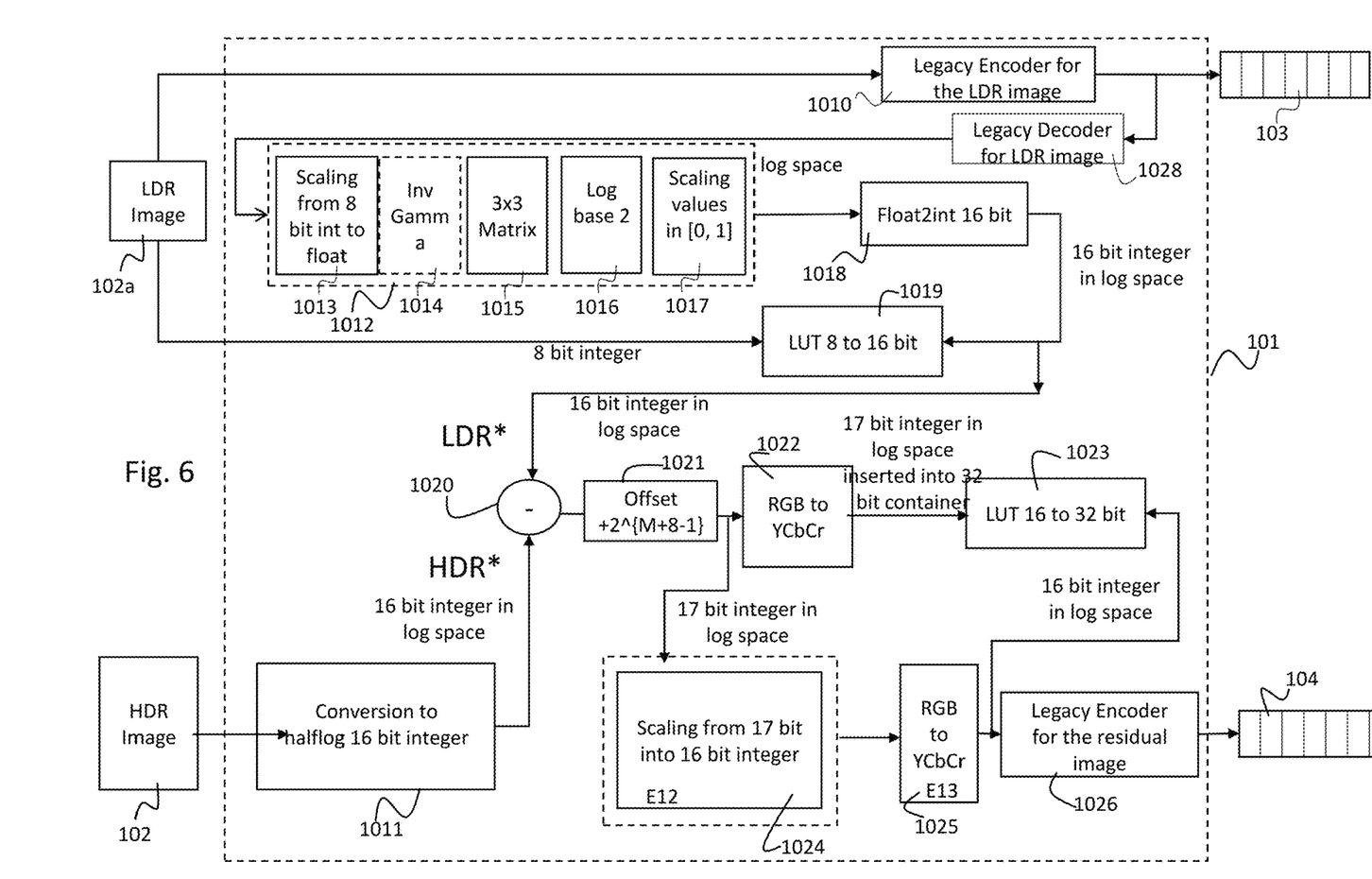
FIG. 6 is a variant of the encoder of FIG. 2.

Although this solution requires additional computational costs for decoding (block 1028) the LDR image encoded in block 1010, this solution improves encoding performance because the residual data are calculated starting from the encoded LDR image. Moreover this solution is useful if the encoder 1010 is a lossy encoder (for example JPEG), since it allows, by means of the look-up tables, the lossy LDR image inserted in the legacy codestream to be reconstructed.

Moreover, although the method described above is shown with reference to the encoding of a digital image, it is clear that the same method can be extended to encode videos, that in a well-known manner are composed of a plurality of images (frames) that are reproduced in sequence. For example if the video is a MPEG format, composed of a plurality of images I, B, P in HDR format, it is possible to apply the method described above to each one of these images.

Finally it has to be noted that the invention is not limited to a hardware encoder and/or decoder but it relates also to computer programs containing code portions that, when executed by the computer, allow encoding and/or decoding methods described above to be implemented. To this end it has to be noted how such methods allow image data to be processed and converted while reducing dimensions of the files storing them (therefore saving memory space to save them and/or saving band necessary for transmission) however guaranteeing a faithful reconstruction of HDR images.

The invention claimed is:

1. A method for encoding high dynamic range (HDR) images, wherein a HDR image is encoded in a first data stream containing a low dynamic range (LDR) image with colour range lower than that of the HDR image, and in a second data stream containing a residual image obtained from the HDR image and from the LDR image, the method comprising:
    processing the LDR image and the HDR image so as to bring them in a same colour space with samples in logarithmic space;
    generating a first residual image in logarithmic space by subtracting the HDR image with samples in logarithmic space from the LDR image with samples in logarithmic space;
    generating the residual image by processing the first residual image in logarithmic space so as to adapt it to a format required as input by an encoder which inserts the residual image in the second data stream;
    generating a first look-up table that maps the values of samples of the LDR image to the values of the processed LDR image in logarithmic space (LDR*);
    generating a second look-up table that maps the values of the residual image samples inserted in the second data stream to the values of the first residual image in logarithmic space; and
    inserting the first and the second look-up table in the first data stream or in the second data stream.

2. The method of claim 1, wherein a data processing operation, including gamma-correction, is utilized to obtain the LDR image from the HDR image, and wherein generating the LDR image with samples in logarithmic space comprises the steps of:
    a) converting the LDR image in a floating point format;
    b) applying a gamma correction to the LDR image inverse to the gamma correction used to obtain the LDR image;
    c) multiplying the gamma corrected LDR image by a matrix suitable to convert the gamma corrected LDR image in a colour space of the HDR image; and
    d) converting in logarithmic space the LDR image generated in step c).

3. The method of claim 2, further comprising the following step:
    e) scaling values of the LDR image generated at step d) within a range of values from 0 to 1.

4. The method of claim 3, further comprising the following step:
    f) converting the image generated at step e) from a floating point format to an integer format using a representation with a same number of bits of the HDR image with samples in logarithmic space.

5. The method of claim 2, wherein before step a) the LDR image is encoded by a lossy encoder which inserts the LDR image in the first data stream and the image inserted in the first data stream is decoded.

6. The method of claim 1, wherein the HDR* image with samples in logarithmic space is generated by converting the HDR image in half log format.

7. The method of claim 1, wherein the residual image is obtained from the first residual image in logarithmic space according to the following steps:
    i. adding an offset value to all samples of the first residual image in logarithmic space to generate a second image, the offset value being a positive value such that all the increased samples of the second image have a value greater than zero;
    ii. representing the samples of the second image obtained at step i. with a number of bits required by an encoder which inserts the residual image in the second data stream; and
    iii. converting the image obtained at step ii. in a colour space accepted by the encoder which inserts the residual image in the second data stream.

8. The method of claim 3, wherein before step a) the LDR image is encoded by a lossy encoder which inserts the LDR image in the first data stream and the image inserted in the first data stream is decoded.

9. The method of claim 4, wherein before step a) the LDR image is encoded by a lossy encoder which inserts the LDR image in the first data stream and the image inserted in the first data stream is decoded.

10. The method of claim 4, wherein the HDR* image with samples in logarithmic space is generated by converting the HDR image in half log format.

11. The method of claim 4, wherein the residual image is obtained from the first residual image in logarithmic space according to the following steps:
    i. adding an offset value to all samples of the first residual image in logarithmic space to generate a second image, the offset value being a positive value such that all the increased samples of the second image have a value greater than zero;
    ii. representing the samples of the second image obtained at step i. with a number of bits required by an encoder which inserts the residual image in the second data stream; and
    iii. converting the image obtained at step ii. in a colour space accepted by the encoder which inserts the residual image in the second data stream.

12. An encoder adapted to receive as input an HDR image and to implement a method according to claim 1.

13. A method of processing image data, comprising the steps of:
    receiving a first data stream containing a low dynamic range (LDR) image;
    receiving a second data stream comprising a residual image necessary to reconstruct a high dynamic range (HDR) image;
    decoding the LDR image from the first data stream;
    decoding the residual image from the second data stream;
    reconstructing the HDR image from the decoded LDR image and the decoded residual image;
further comprising
    extracting from the first or second data stream a first and a second look-up table, wherein the first look-up table maps the values of the LDR image samples to the values of a LDR image in logarithmic space and wherein the second look-up table maps the values of the residual image samples to the values of a residual image in logarithmic space;
    generating the LDR image in logarithmic space from the decoded LDR image using the first look-up table to determine the values of the samples of the LDR image in logarithmic space;

generating the residual image in logarithmic space starting from the residual image using the second look-up table to determine the values of the samples of the residual image in logarithmic space;

reconstructing a logarithmic HDR image by subtracting from the LDR image in logarithmic space the residual image in logarithmic space; and converting from logarithmic space to linear space the logarithmic HDR image.

14. The method of claim 13, further comprising the step of converting the HDR image in linear space to an original format, information on the original format being included in the first data stream or in the second data stream.

15. The method of claim 13, wherein the step of reconstructing the logarithmic HDR image provides to add an offset value to the LDR image in logarithmic space, the offset value being $2^{M+8-1}$ where M is equal to a number of extra bits of the residual image, used in encoding phase, extracted from the second data stream.

16. A decoder adapted to receive as input a first and a second data stream and to implement a method according to claim 13.

17. A method of encoding a high dynamic range (HDR) images, wherein a HDR image is encoded in a first data stream containing a low dynamic range (LDR) image with colour range lower than that of the HDR image, and in a second data stream containing a residual image obtained from the HDR image and from the LDR image, the method comprising:

processing the LDR image and the HDR image so as to bring them in a same colour space with samples in logarithmic space;

generating a first residual image in logarithmic space by subtracting the HDR image with samples in logarithmic space from the LDR image with samples in logarithmic space;

generating the residual image by processing the first residual image in logarithmic space so as to adapt it to a format required as input by an encoder which inserts the residual image in the second data stream;

generating a first look-up table that maps the values of samples of the LDR image to the values of the processed LDR image in logarithmic space (LDR*);

generating a second look-up table that maps the values of the residual image samples inserted in the second data stream to the values of the first residual image in logarithmic space; and inserting the first and the second look-up table in the first data stream or in the second data stream, wherein a data processing operation, including gamma-correction, is utilized to obtain the LDR image from the HDR image, and wherein generating the LDR image with samples in logarithmic space comprises the steps of:

a) converting the LDR image in a floating point format;

b) applying a gamma correction to the LDR image inverse to the gamma correction used to obtain the LDR image;

c) multiplying the gamma corrected LDR image by a matrix suitable to convert the gamma corrected LDR image in a colour space of the HDR image;

d) converting in logarithmic space the LDR image generated in step c);

e) scaling values of the LDR image generated at step d) within a range of values from 0 to 1; and f) converting the image generated at step e) from a floating point format to an integer format using a representation with a same number of bits of the HDR image with samples in logarithmic space.

18. The method of claim 17, wherein before step a) the LDR image is encoded by a lossy encoder which inserts the LDR image in the first data stream and the image inserted in the first data stream is decoded.

19. The method of claim 17, wherein the HDR* image with samples in logarithmic space is generated by converting the HDR image in half log format.

20. The method of claim 17, wherein the residual image is obtained from the first residual image in logarithmic space according to the following steps:

i. adding an offset value to all samples of the first residual image in logarithmic space to generate a second image, the offset value being a positive value such that all the increased samples of the second image have a value greater than zero;

ii. representing the samples of the second image obtained at step i. with a number of bits required by an encoder which inserts the residual image in the second data stream; and iii. converting the image obtained at step ii. in a colour space accepted by the encoder which inserts the residual image in the second data stream.

* * * * *